Figure 3:
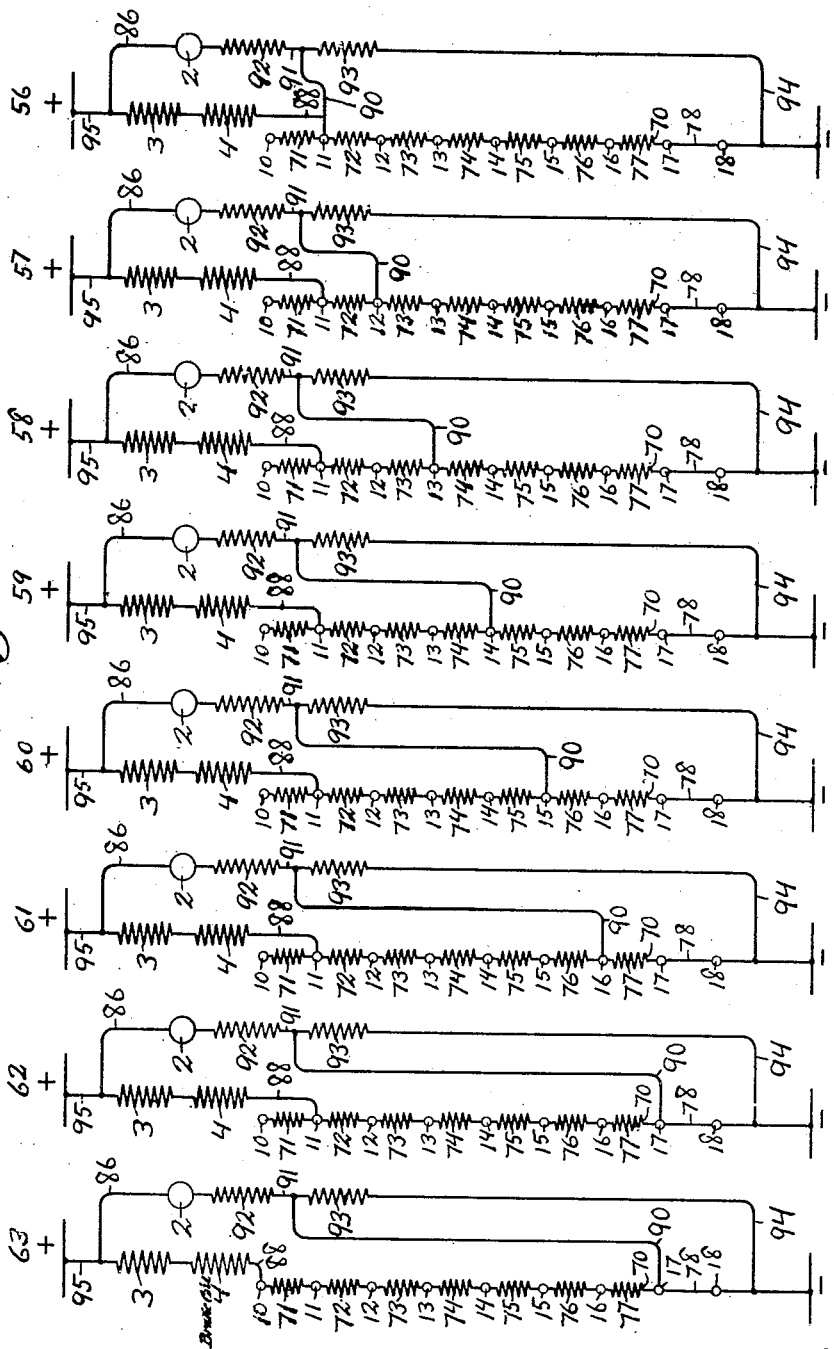

A. C. KELLER.
METHOD OF AND APPARATUS FOR CONTROLLING ELECTRIC MOTORS.
APPLICATION FILED FEB. 25, 1918.
1,293,112.
Patented Feb. 4, 1919.
2 SHEETS—SHEET 1.
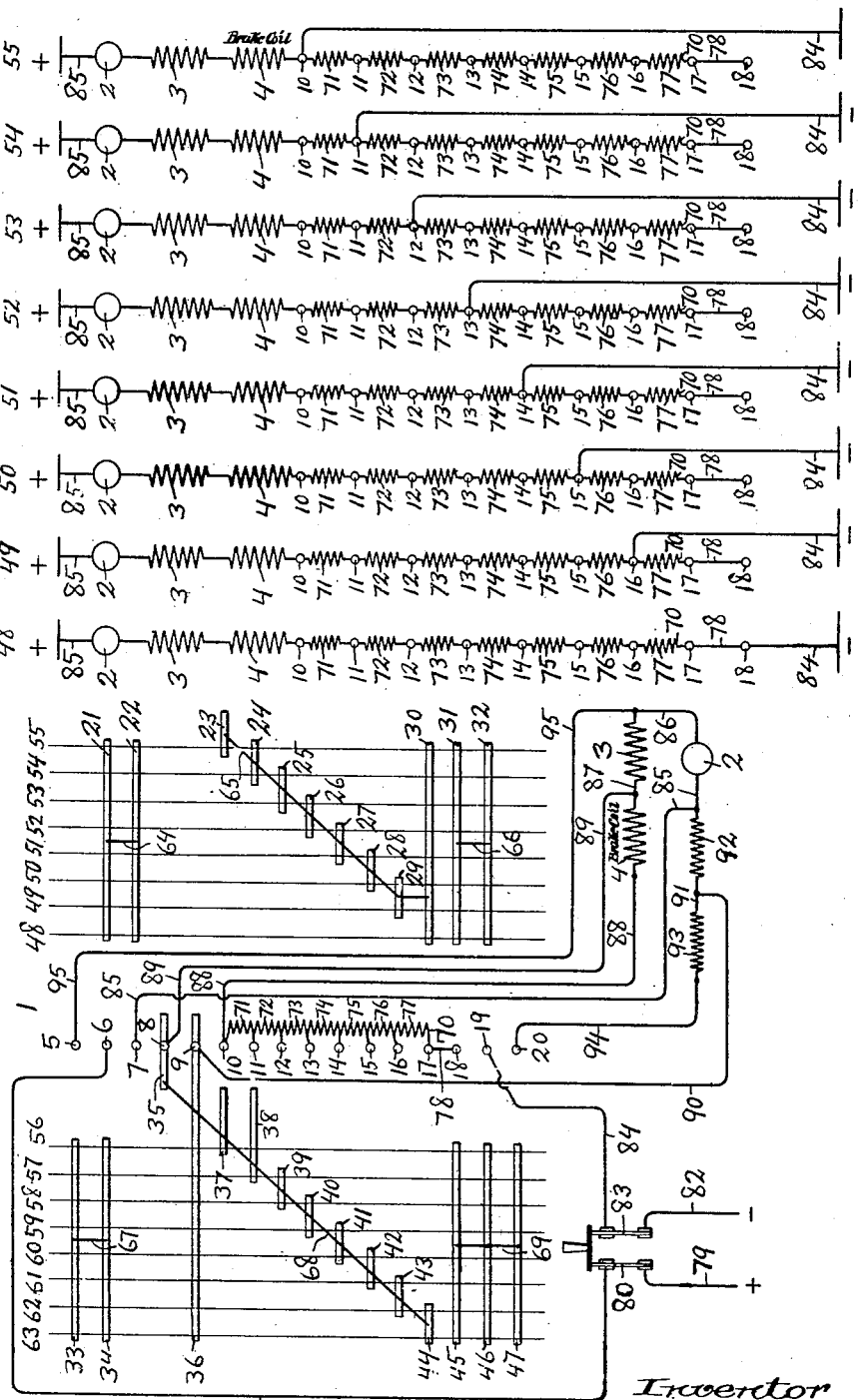

A. C. KELLER.
METHOD OF AND APPARATUS FOR CONTROLLING ELECTRIC MOTORS.
APPLICATION FILED FEB. 25, 1918.

1,293,112.

Patented Feb. 4, 1919.
2 SHEETS—SHEET 2.

Inventor
Arthur C. Keller
By Bottum, Bottum, Hudnall & Fecher
Attorneys.

UNITED STATES PATENT OFFICE.

ARTHUR C. KELLER, OF MILWAUKEE, WISCONSIN, ASSIGNOR TO PAWLING & HARNISCHFEGER COMPANY, OF MILWAUKEE, WISCONSIN, A CORPORATION OF WISCONSIN.

METHOD OF AND APPARATUS FOR CONTROLLING ELECTRIC MOTORS.

1,293,112.

Specification of Letters Patent.   Patented Feb. 4, 1919.

Application filed February 25, 1918.   Serial No. 218,975.

*To all whom it may concern:*

Be it known that I, ARTHUR C. KELLER, a citizen of the United States, residing at Milwaukee, in the county of Milwaukee and State of Wisconsin have invented certain new and useful Improvements in Methods of and Apparatus for Controlling Electric Motors, of which the following is a specification, reference being had to the accompanying drawing, forming a part thereof.

This invention relates to a method of and apparatus for controlling electric motors and the objects of the invention are to improve the methods of controlling electric motors and to improve the apparatus for controlling electric motors in the manner to be hereinafter described and claimed.

This invention is particularly applicable for controlling electric motors which are used for hoisting and lowering loads, and where it is desired to utilize dynamic braking when the motor is reversed for lowering.

Referring to the drawings which accompany this specification and form a part hereof, which drawings illustrate an embodiment of this invention, and on which drawings the same reference characters are used to designate the same parts wherever they may appear in each of the several views, Figure 1 is a diagrammatic illustration of a controller, electric motor, resistances and electrical connections; Fig. 2 is a simplified diagrammatic illustration of the same parts showing the electrical connections when hoisting; and Fig. 3 is a simplified diagrammatic illustration of the same parts showing the electrical connections when lowering.

Referring to the drawings, the reference numeral 1 designates a controller, 2 the armature and 3 the field coil arrangement of any suitable construction of electric motor. The motor is provided with a brake of well-known construction which prevents rotation of the armature 2 except when released by current flowing through the brake releasing magnet coil 4 in the well-known manner. It will be understood that, when current flows through the brake releasing magnet coil 4, the armature 2 is free to be revolved and can be revolved either by the current passing through the motor or by whatever load is supported by the motor.

The controller 1 is illustrated, for convenience, as a development on the plane of the paper of a drum type of controller, though the specific type of controller is of no importance. The reference numerals 5, 6, 7, 8, 9, 10, 11, 12, 13, 14, 15, 16, 17, 18, 19 and 20 designate contacts which it will be assumed are fixed, while the reference numerals 21, 22, 23, 24, 25, 26, 27, 28, 29, 30, 31 and 32 designate the movable contacts for hoisting and the reference numerals 33, 34, 35, 36, 37, 38, 39, 40, 41, 42, 43, 44, 45, 46 and 47 designate the movable contacts for lowering. The reference numerals 48, 49, 50, 51, 52, 53, 54 and 55 designate eight different positions, steps or notches which the movable contacts on the hoisting side may assume to complete electrical circuits through the fixed contacts, and the reference numerals 56, 57, 58, 59, 60, 61, 62 and 63 designate eight different positions, steps or notches which the movable contacts on the lowering side may assume to complete electrical circuits through the fixed contacts. It will, of course, be understood that it is immaterial by what mechanism or construction the movable contacts are made to engage the fixed contacts but, for the purpose of this description, it may be assumed that the movable hoisting and lowering contacts, or fingers, are on a single piece of insulating material which can be moved either to the right or left with respect to the fixed contacts, all as shown by Fig. 1 of the drawings. On the hoisting side the contacts 21 and 22 are electrically connected by the conducting strip 64, the contacts 23, 24, 25, 26, 27, 28, 29 and 30 are electrically connected by the conducting strip 65, and the contacts 31 and 32 are electrically connected by the conducting strip 66. On the lowering side the contacts 33 and 34 are electrically connected by the conducting strip 67, the contacts 35, 36, 37, 38, 39, 40, 41, 42, 43 and 44 are electrically connected by the conducting strip 68, and the contacts 45, 46 and 47 are electrically connected by the conducting strip 69.

A resistance 70 is connected with the fixed contacts 10 and 17 and the fixed contacts 11, 12, 13, 14, 15 and 16 are connected with the resistance so as to provide resistance sections 71, 72, 73, 74, 75, 76 and 77 in an ordinary manner. A bridge piece 78 provides an electrical connection between the fixed contacts 17 and 18.

The reference numeral 79 designates the positive feed wire which can be connected by the switch blade 80 to the positive lead 81 which is connected with the fixed contact 6. The reference numeral 82 designates the negative, or return, wire of the feed or power circuit which can be connected by the switch blade 83 to the negative or return lead 84 which is connected with the fixed contact 19. The wire 85 is connected with the fixed contact 7 and can conduct current to the armature 2 to revolve the armature 2 in the direction for hoisting when the fixed contacts 6 and 7 are electrically connected by the movable contacts 21 and 22 and the conducting strip 64. When the movable contacts are moved to the left, looking at Fig. 1 of the drawings, until the line 48 (which designates the first position, notch or step of the controller in hoisting) coincides with the fixed contacts 5 to 20, both inclusive, the current passes from the positive lead or wire 81 through the fixed contact 6, movable contact 21, conducting strip 64, movable contact 22, fixed contact 7, wire 85, armature 2, wire 86, field coils 3, wire 87, brake releasing magnet coil 4, wire 88, fixed contact 10, all the sections of resistance 70, fixed contact 17, bridge piece 78, fixed contact 18, movable contact 31, conducting strip 66, movable contact 32 and fixed contact 19 to the negative lead or wire 84. This course of the current is illustrated by the left hand diagram of Fig. 2 which shows the armature 2, the field coils 3, the brake releasing magnet coil 4 and all the sections of the resistance 70 in series. The motor operates as an ordinary series motor when the power is being turned on for hoisting and the resistance 70 is cut out a section at a time as clearly shown by Fig. 2 of the drawings. The resistance 70 is cut in a section at a time as the power is turned off, in the ordinary manner, and the hoisting operation of the motor requires no further description.

Fig. 1 of the drawings illustrates the movable contacts in the positions which they occupy when the controller is in the stop, off or neutral position. No current can flow from the fixed contact 6 to the fixed contact 19 but the motor is short circuited so that, if a weight supported by the armature 2 were to fall, as a result of the brake failing to hold, for example, the armature 2 by its rotation would generate a current and energize the field coils 3 and stop the rotation of the armature by what is known as dynamic braking. To accomplish this result the fixed contacts 8 and 9 are electrically connected by the movable contact 35, the conducting strip 68 and the movable contact 36. A wire 89 connects the fixed contact 8 with the wire 87 and a wire 90 connects the fixed contact 9 with the wire 91. A resistance 92 is interposed between the wire 91 and the wire 85 and limits the current which can be produced when the controller is rapidly moved from lowering positions to the off position. Another resistance 93 is interposed between the wire 91 and the wire 94 which is connected with the fixed contact 20. The resistance 70 will be referred to as the main resistance, the resistance 92 will be referred to as the second resistance and the resistance 93 will be referred to as the third resistance.

There are two general conditions which may exist when the controller is in the lowering positions. The armature may have to be rotated by the current to overcome the friction to lower the hoisting cable or a light load. The load, on the other hand, may be so heavy that it will overhaul the motor or rotate the armature so fast that the armature will generate a current equal to or greater than the current supplied to the motor. Under these several conditions, current may or may not flow from the power line through the armature or current may flow from the armature to the power line. In all cases, however, the armature must be under control. Of course the armature is under the control of the controller when the armature is being rotated by the current as a motor, but when the armature is being rotated by the load the control over it is the resistance to rotation caused by the magnetic field generated by the current flowing through the field coils and known as dynamic braking. It will be immediately apparent that it is absolutely essential to have full and complete control of the armature and load when the controller is moved from the off position to the first notch, step or position for lowering. This invention provides a method and apparatus for securing this absolutely essential control by permitting a large current to flow through the field coils to produce a powerful magnetic field when the controller is moved to the first notch, step or position for lowering and reducing the current and the magnetic field as the controller is moved to other notches, steps or positions of the lowering positions to permit higher lowering speed to be obtained.

This result is obtained as follows: A wire 95 connects the fixed contact 5 with the wire 86. The fixed contacts 6 and 5 are adapted to be electrically connected by the movable contact 34, the conducting strip 67 and the movable contact 33. When the controller is moved to the first notch, step or position for lowering so that the line 56 coincides with the fixed contacts 5 to 20, both inclusive, the current passes from the positive lead or wire 81 through the fixed contact 6, the movable contact 34, the conducting strip 67, the movable contact 33, the fixed contact 5 and wire 95 to wire 86. The current can now flow through two parallel circuits one of which includes the field coils 3 and the brake releasing magnet coil 4 and the other of which includes the armature 2 and the resistance 92 as clearly shown by the right hand diagram of Fig. 3 of the drawings. Leaving out of consideration for the present the armature circuit and considering only the field coil circuit, the resistance 93 is in parallel with the resistance 70 so a large current can flow through the field coils 3 and generate a strong magnetic field to prevent the armature 2 from being rotated by the load. The resistances 70 and 93 being in parallel the total resistance to current flowing through the field coils 3 is less than would be the case if either resistance 70 or resistance 93 were used alone, and, consequently, a large current is permitted to flow through the field coils 3 to generate a strong magnetic field to prevent rotation of the armature 2 by the load faster than desired. It will be understood, of course, that the electrical design of the motor is sufficiently powerful to hoist any load which must be lowered and, as a consequence, excessive rotation of the armature 2 will be prevented by the dynamic braking action of the motor.

Referring to Fig. 3 of the drawings and following the changes in the circuit connections, shown by the diagrams, as the controller is moved to the different notches, steps or positions in lowering, it will be noticed that in the first position 56 both wires 88 and 90 are illustrated as connected with the fixed contact 11 and that one section of the resistance 70 is cut out. This construction is due simply to the specific conditions required in the motor illustrated. In this specific construction one section of the resistance 70 is cut out by the wire 88 in all of the positions 56, 57, 58, 59, 60, 61 and 62 but is cut in in the last position 63. The circuits can be readily traced upon Fig. 1 of the drawings. In the diagrams illustrated by Fig. 3 of the drawings the section 71 of the resistance 70 is retained as the section of the resistance which remains cut out in order to simplify the diagrams and to show that one section of the resistance is cut out. The wire 90 is connected in succession with the fixed contacts 11, 12, 13, 14, 15, 16 and 17, cutting out one section of the resistance 70 at a time, until all of the resistance 70 which was in circuit with it has been cut out. In the last position 63 the wire 88 is connected with the entire resistance 70 in series with the result that the flow of current through the field coils 3 is diminished, the magnetic field produced is diminished and the armature 2 can be rotated rapidly.

It will be readily apparent that the load is under control at all times while it is being lowered by the dynamic braking effect as the speed at which the armature 2 can be rotated by a load depends upon the strength of the magnetic field in which the armature rotates and this magnetic field is strongest when the controller is in the first lowering position and weakest when the controller is in the last, or highest speed, lowering position.

The armature 2 can always take current from the power line to cause it to rotate to overcome friction when lowering a light load or slacking down a cable with no load attached and it will be readily understood that when the armature 2 is rotated by a load the speed of rotation will be governed by the strength of the magnetic field generated by the current flowing through the field coils 3 so that at a certain intensity or strength of magnetic field and a certain speed of rotation of the armature no current will flow through the armature from the power line. If, when the controller is in a certain position, the load rotates the armature at a faster speed so that the counter electromotive force generated is greater than the voltage in the power line the armature will act as a generator and supply current to the power line but, even under such conditions, the principle of dynamic braking hereinbefore described remains unchanged, and by moving the controller back toward the first lowering position the strength or intensity of the magnetic field is increased offering more resistance to the rotation of the armature.

What is claimed is:

1. The method of controlling an electric motor which consists in connecting a resistance in series with the armature, connecting the armature and said resistance in parallel with the field coil arrangement, connecting a main resistance and a third resistance in parallel, connecting said main resistance and said third resistance (in parallel) in series with both the armature and the field coil arrangement, and then cutting out, or short circuiting, said third resistance.

2. The method of controlling an electric motor consisting in establishing an armature and resistance circuit and a field and resistance circuit in parallel across the supply lines, and establishing a connection between said circuits which is movable with respect to a resistance.

3. The method of controlling an electric motor consisting in connecting the field with a resistance and the armature with a resistance in parallel circuits across the supply lines and establishing a connection from a point between the armature and one resistance to successive points on the other resistance.

4. In apparatus for controlling electric motors, the combination with the field coil arrangement, of a main resistance, an armature, a third resistance, and means to cut out or short circuit said third resistance while the field coil arrangement is connected in parallel with the armature.

In witness whereof I hereto affix my signature.

ARTHUR C. KELLER.